(12) United States Patent
Patel (10) Patent No.: US 8,990,381 B2
(45) Date of Patent: Mar. 24, 2015

(54) METHOD AND APPARATUS FOR MANAGING COMMON AND APPLICATION SPECIFIC PRESENCE INFORMATION

(75) Inventor: Virat G. Patel, Des Plaines, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 598 days.

(21) Appl. No.: 12/983,156

(22) Filed: Dec. 31, 2010

(65) Prior Publication Data

US 2012/0173706 A1 Jul. 5, 2012

(51) Int. Cl.
- G06F 15/173 (2006.01)
- H04L 29/08 (2006.01)
- H04L 29/06 (2006.01)

(52) U.S. Cl.
CPC ............ *H04L 67/24* (2013.01); *H04L 63/083* (2013.01); *H04L 63/102* (2013.01); *H04L 63/126* (2013.01); *H04L 65/1006* (2013.01)
USPC ......................................................... 709/224

(58) Field of Classification Search
CPC ...................................................... H04L 67/24
USPC ......................................................... 709/224
See application file for complete search history.

(56) References Cited

U.S. PATENT DOCUMENTS

| | | | |
|---|---|---|---|
| 2002/0171673 A1 | 11/2002 | Brown et al. | |
| 2005/0255811 A1* | 11/2005 | Allen et al. | 455/78 |
| 2006/0039368 A1* | 2/2006 | Punaganti Venkata et al. | 370/386 |
| 2007/0100981 A1* | 5/2007 | Adamczyk et al. | 709/223 |
| 2007/0189301 A1* | 8/2007 | Kiss et al. | 370/395.2 |
| 2008/0010301 A1* | 1/2008 | Tian et al. | 707/10 |
| 2008/0068371 A1* | 3/2008 | Sun et al. | 345/418 |
| 2008/0313329 A1* | 12/2008 | Wang et al. | 709/224 |
| 2009/0193069 A1* | 7/2009 | Alexander et al. | 709/203 |
| 2009/0319655 A1* | 12/2009 | Viamonte Sole | 709/224 |
| 2010/0088371 A1* | 4/2010 | Xu et al. | 709/203 |

FOREIGN PATENT DOCUMENTS

| | | |
|---|---|---|
| JP | 06083847 A | 3/1994 |
| KR | 1020060131069 A | 12/2006 |
| KR | 100915187 B1 | 9/2009 |

OTHER PUBLICATIONS

Rosenberg, J., et al., "SIP: Session Initiation Protocol," Network Working Group, RFC 3261, Jun. 2002.
IBM Websphere Presence Server; Apr. 2009; 4 Pages.
(Continued)

*Primary Examiner* — Michael Y Won
(74) *Attorney, Agent, or Firm* — Steven May (57) ABSTRACT

A method and apparatus for managing common and application specific presence information, wherein the apparatus programs a computer to perform the method, which includes: receiving a publication message comprising presence information from a presentity; partitioning the presence information into common presence information and application specific presence information; storing the common presence information in a common presence information database, wherein authorization for access to the common presence information database is controlled by the presence server; and forwarding the application specific presence information to an external application, wherein the external application controls storage of the application specification presence information and authorization for access to the application specific presence information.

13 Claims, 8 Drawing Sheets

(56) References Cited

OTHER PUBLICATIONS

IBM Websphere Presence Server; First Edition; Version 7.0; Apr. 2009; 208 Pages.

Network Working Group; E. Burger, Cantata Technology, Inc.; RCF 4483; May 2006; A Mechanism for Content Indirection in Session Initiation Protocol (SIP) Messages; 18 Pages.

Network Working Group; J. Rosenberg, Cisco; RFC5025; Dec. 2007; "Presence Authorization Rules"; 29 Pages.

Network Working Group; H. Sugano, et al. RFC3863; Aug. 2004; Presence Information Data Format (PIDF); 29 Pages.

Network Working Group; H. Schulzrinne, et al. RFC4745; Feb. 2007; "Common Policy:A Document Format for Expressing Privacy Preferences"; 33 Pages.

Network Working Group; M. Isomaki, et al; RFC4827; May 2007; "An Extensible Markup Language (XML) Configuration Access Protocol (XCAP) Usage for Manipulating Presence Document Contents", 12 Pages.

Rosenberg, J., et al., "SIP: Session Initiation Protocol, "Network Working Group, RFC 3261, Jun. 2002.

International Search Report and Written Opinion for International Patent Application No. PCT/US2011/067718 mailed on Aug. 29, 2012.

* cited by examiner

METHOD AND APPARATUS FOR MANAGING COMMON AND APPLICATION SPECIFIC PRESENCE INFORMATION

TECHNICAL FIELD

The present disclosure relates generally to presence information management and in particular to a method and apparatus for managing common and application specific presence information.

BACKGROUND

In computer and telecommunications networks, presence information is defined as a status indicator that conveys status data, such as availability, activities, and physical location, of a presentity. A presentity is defined as an entity described by presence information. A presentity usually refers to a human (a user), but can also refer to a group of users. A presentity provides presence information to a presence service that runs on a presence server. The presence service stores the presence information in a presence information database (also interchangeably referred to herein as a store).

The process wherein the presence service collects presence information is termed aggregation. In addition, the presence service distributes presence information to entities called watchers, wherein a watcher is defined as an entity (a user) that requests information about a presentity from a presence service. A watcher can subscribe to presence information from a presence service by requesting notification from the presence service; and in such a case, the watcher is referred to as a subscriber. Alternatively, a watcher may fetch presence information from a presence service by simply requesting the current value of a presentity's presence information; and in such a case, the watcher is referred to as a fetcher. Oftentimes, a presence server is a centralized server running a presence service, which authorizes a presentity, and stores (or saves) the presentity's presence information in a centralized database. Moreover, the presence service authorizes a watcher, and retrieves (or gets) presence information from the centralized database before forwarding the presence information to the watcher. However, in deployments where the presence server aggregates presence information of a user across a varied set of applications, some part of the user's presence information may comprise information that is relevant and common to all contributing applications (which thus defines "common" presence information) while the other may be viewed as application specific (which thus defines application specification presence information).

For example, a police officer's availability and physical location is relevant to all applications that are running on a dispatcher's computer and the police officer's computer or device, and can, thus, be deemed as common presence information. To the contrary, the application specific presence information is only relevant to a specific application. For instance, for a job-ticketing application, a user's completion status for a particular job ticket or an enumeration of the various job tickets that a user is currently working on may be viewed as application specific presence information.

Accordingly, there is a need for a method and apparatus to partition presence information into common and application specific presence information and to store and manage access to this presence information.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for managing common and application specific presence information. In accordance with the present teachings, a method performed by a presence server includes receiving a publish message (also interchangeably referred to as publication message) from a presentity. The publish message comprises presence information of the presentity. The method further includes partitioning the presence information into common presence information and application specific presence information. The presence server authorizes the presentity for access to a common presence information database that is controlled by the presence server. Moreover, the presence server stores the common presence information in the common presence information database. In addition, the method includes forwarding the application specific presence information to an external application, wherein the external application controls storage (also interchangeably referred to as a store or a database) of the application specification presence information. Moreover, the external application authenticates and authorizes the presentity for access to the application specific presence information storage before saving the application specific presence information in the application specific presence information storage.

Figure 1:
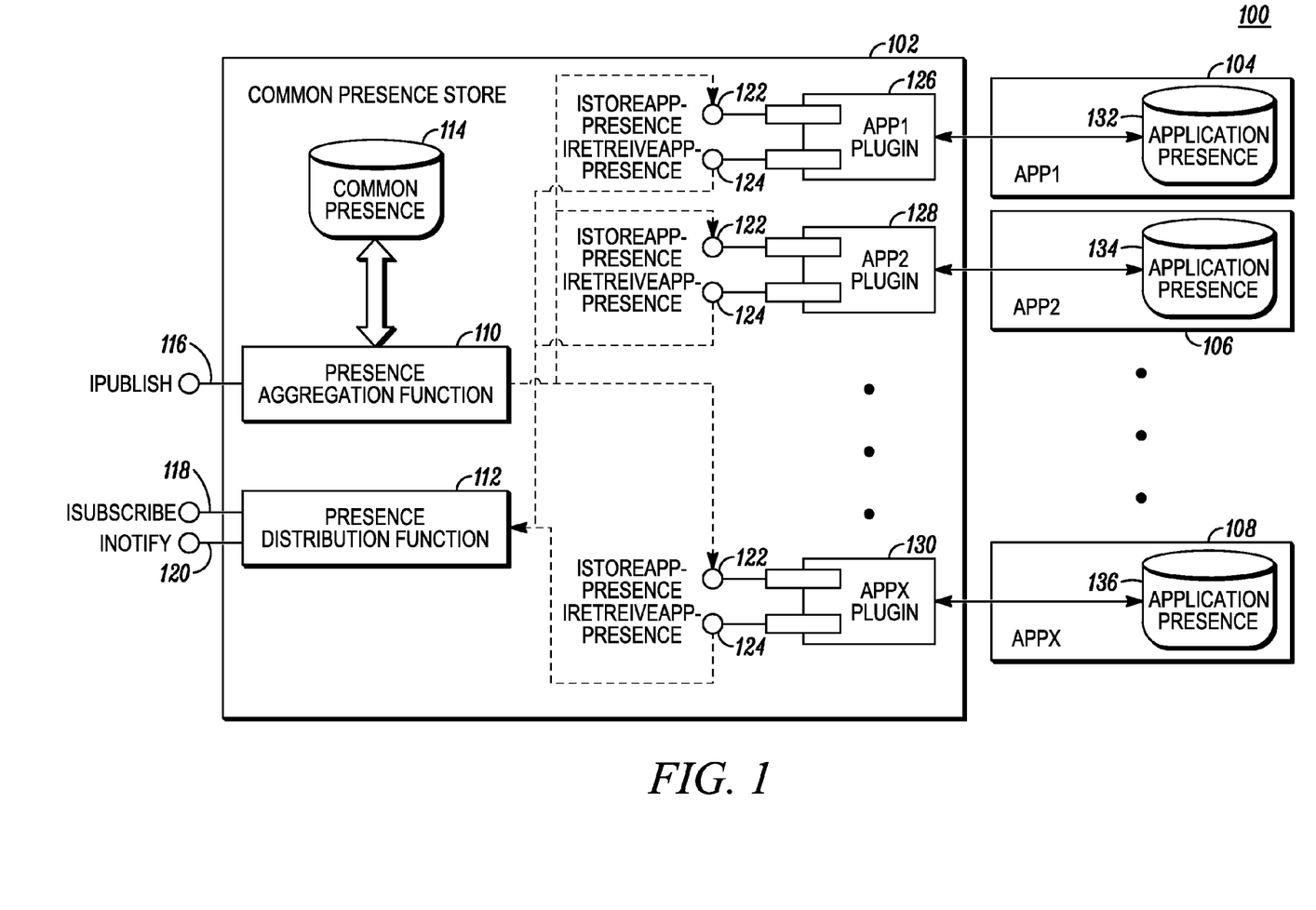
FIG. 1 illustrates a system implementing embodiments of the present teachings.

Referring now to the drawings, and in particular FIG. 1, an illustrative system implementing embodiments in accordance with the present teachings is shown and indicated generally at 100. System 100 comprises a presence server 102. In general, the presence server 102 is implemented using one or more memory devices (including a common presence store 114), hardware network interfaces (not shown), software interfaces, and processing devices (not shown), that are operatively coupled, and which when programmed form the means for these system elements to implement their desired functionality. The hardware network interfaces are a point of interaction between hardware components (such as between the presence server and a communication device that implements a watcher) and are used for passing signaling, also referred to herein as messaging, (e.g., messages, packets, datagrams, frames, superframes, and the like) between hardware elements over a communication network. The implementation of the hardware network interface in any particular element depends on the particular type of network, i.e., wired and/or wireless, to which the element is connected.

Where the network supports wireless communications, the hardware interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

As used herein, a software interface means a point of interaction between software components or modules. A software component often encapsulates a set of related functions (or data). For example, a class in object-oriented computer languages is a software component. The interface of a software component is often kept separate from the implementation (i.e., actual code) of the component. For example, in object-oriented computer languages the term "interface" defines an abstract type that contains no data but exposes behaviors defined as methods. An interface often exposes more than one method. A class that implements all the methods of an interface is said to implement that interface. Moreover, a class can implement more than one interface. A program can use a method in an interface by invoking or calling the method. To call a method, the calling program has to pass to the method parameters required by the method.

The processing device utilized by the presence server 102, software plug-ins, and external applications may be programmed with software or firmware logic or code for performing functionality described by reference to FIG. 2 to FIG. 8; and/or the processing device may be implemented in hardware, for example, as a state machine or ASIC (application specific integrated circuit) to perform such functionality. The memory implemented by these system elements can include short-term and/or long-term storage, such as disks and databases for example, of various information needed for the functioning of the respective elements. The memory may further store common and application specific presence information and software or firmware for programming the processing device with the logic or code needed to perform its functionality.

A presence service running on the presence server 102 performs a presence aggregation function 110 and a presence distribution function 112. The presence aggregation function 110 implements a software interface IPublish 116, through which a presentity provides presence information to the presence service. The presence aggregation function 110 receives presence information from a presentity, and partitions the presence information into common presence information and application specific presence information. In addition, the presence aggregation function 110 stores the common presence information in a common presence store 114 if the presentity is authenticated and authorized to access to the store 114.

The presence distribution function 112 provides presence information to watchers through a subscriber software interface ISubscribe 118 and a notify us software interface INotify 120. A watcher requests from the presence server 102 for presence information by calling the subscriber interface ISuscribe 118. Alternatively, a watcher requests notification from the presence server 102 of future changes in one or more presentities' presence information by calling the subscriber interface ISuscribe 118. When the requested presence information is available, the presence distribution function 112 forwards the presence information to the watcher through the notify interface INotify 120.

To manage the application specific presence information, the presence server 102 uses a plugin (also interchangeably referred to as plug-in or Application Programming Interface (API) client) architecture. A plugin is defined as a software component that runs in one application or system, and communicates with a second application or system (i.e., an external application to the presence server 102) using knowledge or protocols that are private to the plugin and the second application or system, wherein the functions 110 and 112, of the presence server 102, which processes the common presence information has no knowledge of the protocols used between the plug-in and the second or external application. Within the plugin architecture of the presence server 102, a plugin is used to communicate with a specific application to manage presence information that is specific to the application. For example, a plugin 126 communicates with an application 104 to manage presence information that is specific to application 104. The plugin 126 runs on the presence server 102, while the application 104 runs on a different system, which may be in a geographically different location from that of the presence server 102. The plugin 126 implements an application Presence Information Data Format (PIDF) store software interface IStoreAppPresence 122, which the presence aggregation function 110 calls to store presence information that is specific to the application 104. The presence information that is specific to the application 104 is stored in an application PIDF store 132, which is controlled by the application 104.

Moreover, the plugin 126 implements an application PIDF retrieve software interface IRetrieveAppPresence 124, which the presence distribution function 112 calls to retrieve presence information that is specific to the application 104. The requested presence information is retrieved from the application PIDF store 132 that is controlled by the application 104. Responsive to a call by the presence service to the interface IStoreAppPresence 122 or IRetrieveAppPresence 124, the plugin 126 communicates with the application 104 to store or retrieve presence information respectively. In addition, the plugin 126 performs authentication and authorization for access to the application PIDF store 132. For example, the presence aggregation function 110 calls the application PIDF store interface IStoreAppPresence 122 with authorization credentials of a presentity as a parameter. The authorization credentials of the presentity usually include the identity of the presentity and a trust assertion from the presence server 102.

The trust assertion may be a password, passphrase, a X.509 certificate, a Security Assertion Markup Language (SAML) token, or the like. Likewise, the authorization credentials of a watcher usually include the identity of the watcher and a trust assertion from the presence server 102. The presence distribution function 112 calls the application PIDF retrieve interface IRetrieveAppPresence 124 with authorization credentials of a watcher as a parameter.

The plugin 126 may request the application 104 to authenticate and authorize the presentity for accessing the application PIDF store 132. In alternate embodiment of the present teachings, the plugin 126 may authenticate and authorize the presentity for accessing the application PIDF store 132 without communicating with the application. The application PIDF store 132 is not accessed when the presentity fails authorization. Alternatively, the plugin 126 may access the application PIDF store 132 directly, without communicating with the application 104. Furthermore, in an alternate embodiment in accordance with the present teachings, the plugin 126 may authenticate and authorize a presentity or watcher first, and does not authorize the presentity or watcher again in response to subsequent calls to the interfaces IStoreAppPresence 122 or IRetrieveAppPresence 124.

Under the plugin architecture, the presence server 102 supports more than one plugin simultaneously. For example, plugins 128 and 130 correspond to applications 106 and 108 respectively. Applications 106 and 108 control application PIDF stores 134 and 136 respectively. In addition, both plugins 128 and 130 implement the software interfaces IStoreAppPresence 122 and IRetrieveAppPresence 124.

Figure 2:
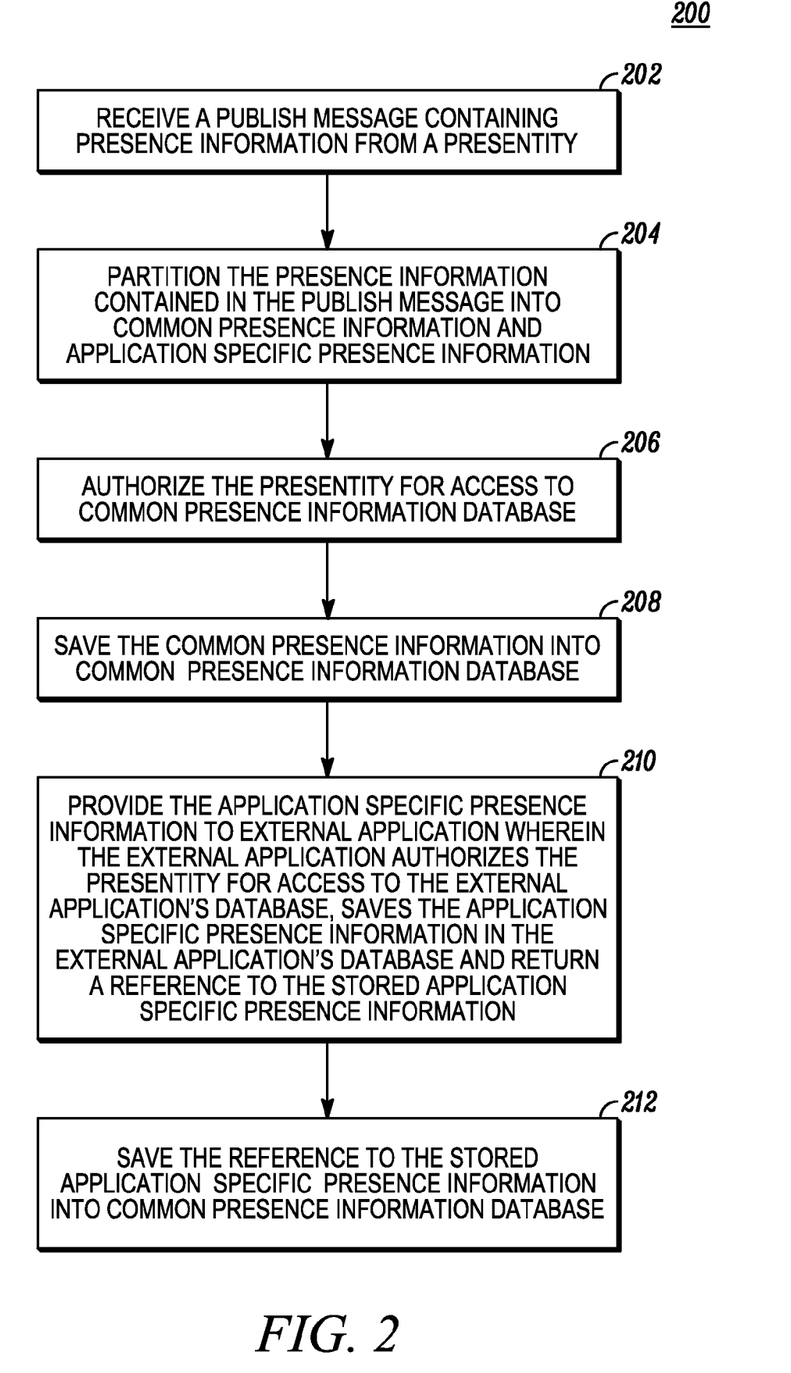
FIG. 2 is a logical flowchart illustrating a method in accordance with some embodiments.

Turning now to FIG. 2, a logical flowchart illustrating a method 200, performed by a presence service running on a presence server, in accordance with some embodiments of the present teachings is shown. At 202, the presence service receives a publish message. The publish message comprises presence information of the presentity, and the presence information includes both common presence information and application specific presence information. In accordance with the present teachings, the publish message is represented in Multipurpose Internet Mail Extensions (MIME) format, and comprises two types of content. The first type of content comprises common presence information, while the other type of content comprises application specific presence information. Both common and application specific presence information is in PIDF. In one illustrative implementation, the publish message is a SIP message (having a structure as described in Internet Engineering Task Force (IETF) Request for Comments (RFC) 3261, published June 2002, in any subsequent revisions and related RFCs), which is modified to include the common and application specific presence information in him MIME format At 204, the presence service partitions the presence information into common presence information and application specific presence information. Moreover, the presence service authenticates and authorizes the presentity for access to a common presence information database at 206. If the presentity is authorized to access to the common presence information database, the presence service saves the common presence information in the common presence information database at 208. At 210, the presence service provides the application specific presence information and authorization credentials of the presentity to an external application, such as the application 104 in FIG. 1. The external application authenticates and authorizes the presentity for access to the external application's database, such as the application PIDF store 132 in FIG. 1. If the presentity is authorized to access the external application's database, the external application saves the application specific presence information in the external application's database, and returns a reference to the stored application specific presence information to the presence service. At 212, the presence service saves the reference in the common presence information database that is controlled by the presence server.

Figure 3:
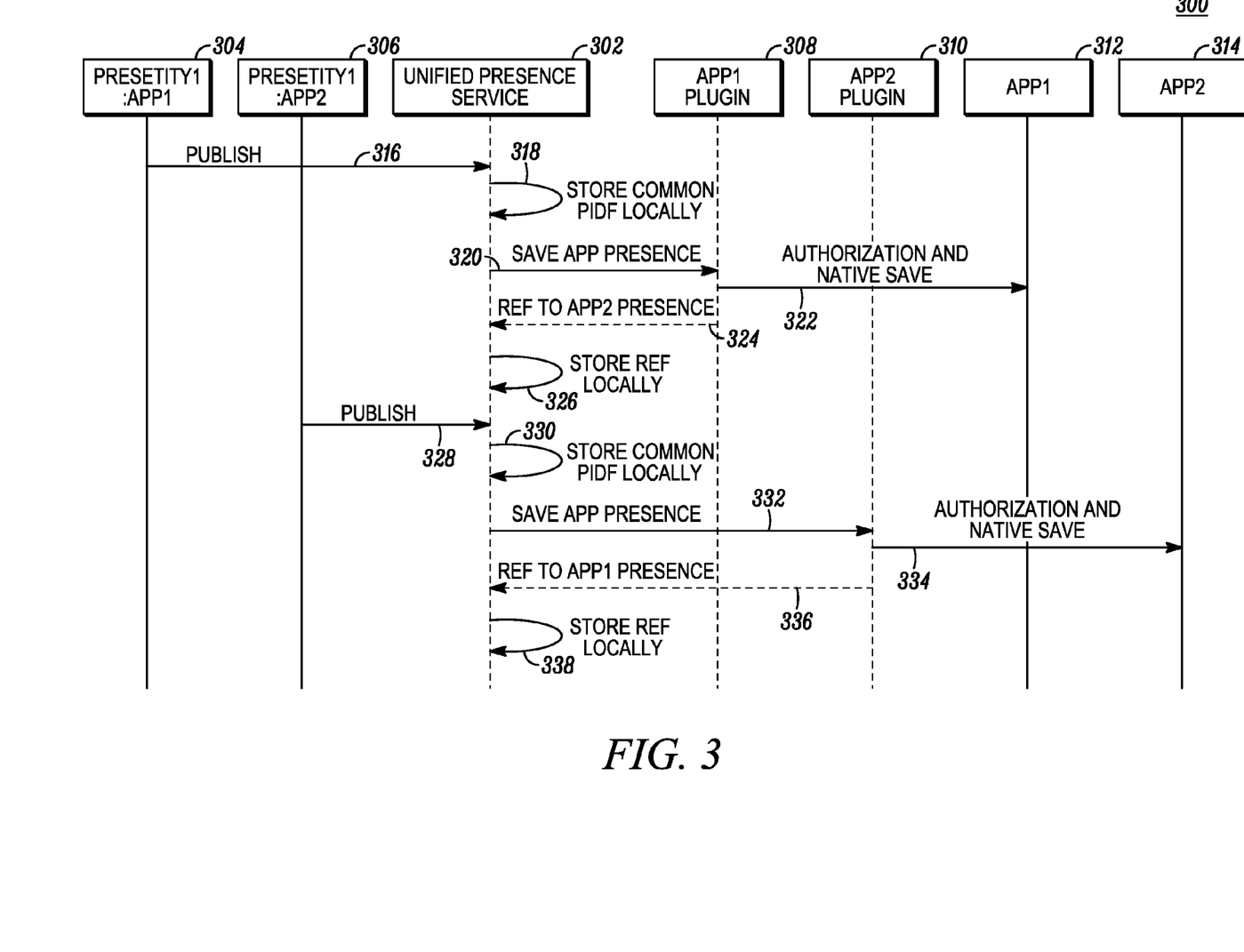
FIG. 3 illustrates a message sequence diagram in accordance with some embodiments.

Referring to FIG. 3, a message sequence diagram illustrating a method 300 in accordance with some embodiments of the present disclosures is shown. Method 300 comprises a presence server 302 running a presence service Unified Presence Service. The presence server 302 comprises two plugins, App1 Plugin 308 and App2 Plugin 310, communicating with two applications, App1 312 and App 2 314, respectively. It should be noted that the present teachings support more applications along with corresponding plugins. Moreover, the method 300 comprises a presentity running two different applications, Presentity1: App1 304 and Presentity1: App2 306, publishing or providing presence information to the presence server 302. However, more presentities and applications may communicate with the presence server 302 to publish presence information. At 316, the presentity 304 provides presence information, including both common presence information and application specific presence information, to the presence service 302 using a publish message such as a modified SIP PUBLISH message. The publish message is represented in MIME format, and comprises two types of content. The first type of content comprises common presence information, while the other type of content comprises application specific presence information. At 318, the presence service receives the publish message, and partitions the presence information contained in the publish message into common presence information and application specific presence information. In addition, the presence service authenticates and authorizes the presentity 304 for access to a common presence information store at 318. If the presentity 304 is successfully authorized, the presence service saves the common presence information in the common presence information store at 318.

At 320, the presence service forwards the application specific presence information and authorization credentials of the presentity 304 to the plugin 308 by calling an application PIDF store interface of the plugin 308. At 322, the plugin 308 requests the application 312 to authenticate and authorize the presentity 304 for access to an application specific presence information store that is controlled by the application 312. If the application 312 grants the access, the plugin 308 requests the application 312 to save the application specific presence information in the application specific presence information store. Alternatively, the application 312 immediately saves the application specific presence information in the application specific presence information store after the presentity 304 is authorized to access the application specific presence information store. The plugin 308 a reference to the saved application specific presence information from the application 312, and returns the reference to the presence service 302 at 324. Accordingly, the presence service 302 saves the reference in a local store, such as the common presence information store, at 326.

Similarly, the presentity 306 provides presence information to the presence service 302 at 328. At 330, the presence service receives the presence information, and partitions the presence information into common presence information and application specific presence information. In addition, the presence service authorizes the presentity 306 for access to a common presence information store at 330. If the presentity 306 is authorized for such access, the presence service saves the common presence information in the common presence information store at 330.

At 332, the presence service forwards the application specific presence information and authorization credentials of the presentity of 306 to the plugin 310 by calling an application PIDF store interface of the plugin 310. At 334, the plugin 310 requests the application 314 to authenticate and authorize the presentity 306 for access to an application specific presence information store that is controlled by the application 314. If the application 314 grants the access, the plugin 310 requests the application 314 to save the application specific presence information in the application specific presence information store. Alternatively, the application 314 immediately saves the application specific presence information in the application specific presence information store after the presentity 306 is authorized to access the application specific presence information store. The plugin 310 receives a reference to the saved application specific presence information from the application 314, and returns the reference to the presence service 302 at 336. The presence service 302 then saves the reference in a local store, such as the common presence information store, at 338.

Figure 4:
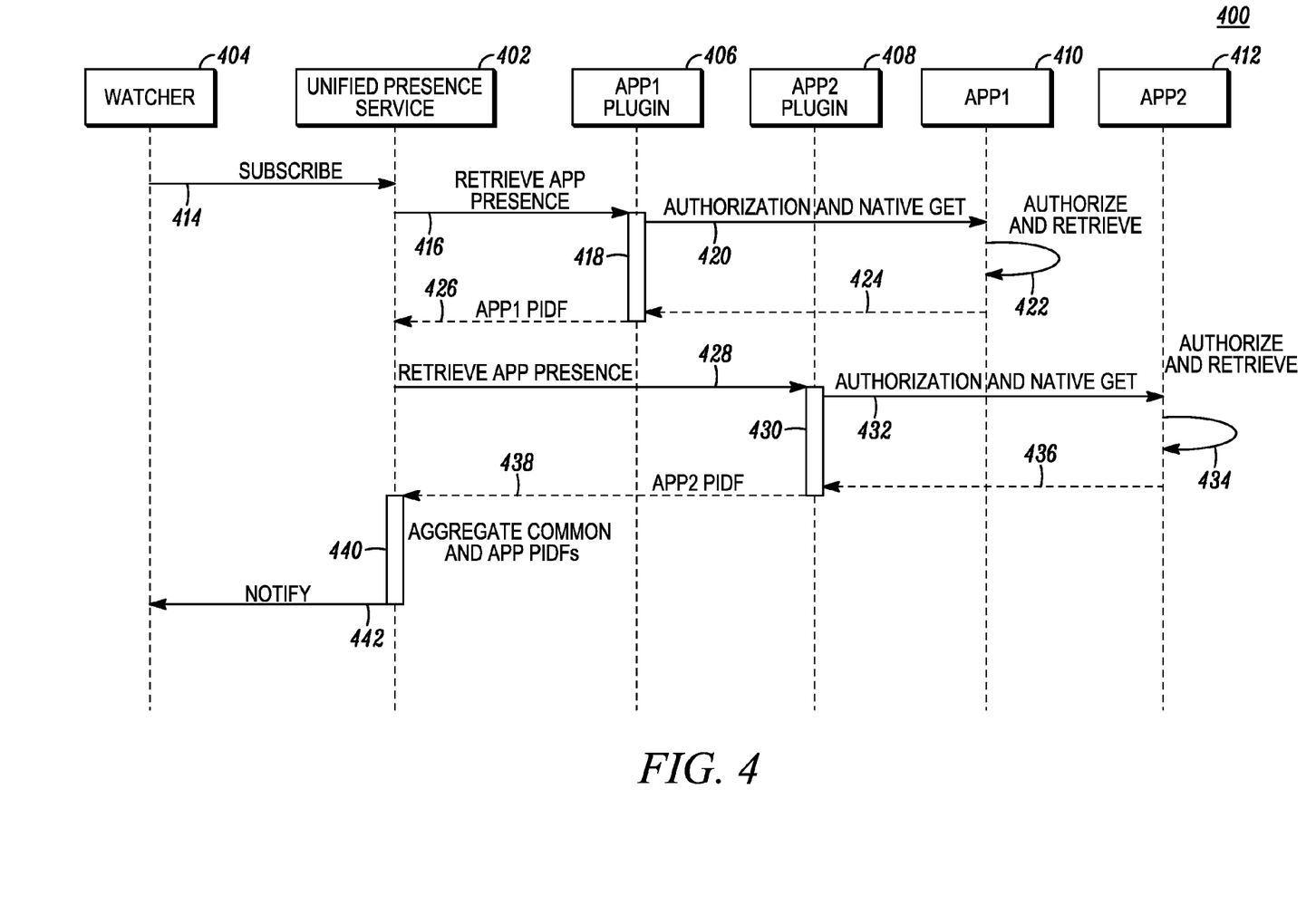
FIG. 4 illustrates a message sequence diagram in accordance with some embodiments.

Turning now to FIG. 4, a message sequence diagram illustrating a method 400 in accordance with some embodiments of the present disclosures is shown. Method 400 comprises a presence server 402 running a presence service Unified Presence Service. The presence server 402 further comprises two plugins, App1 Plugin 406 and App2 Plugin 408, communicating with two applications, App1 410 and App2 412, respectively. It should be noted that the present teachings support more applications along with corresponding plugins. Moreover, the method 400 comprises a watcher Watcher 404. However, more watchers may communicate with the presence server 402 to request presence information. At 414, the watcher 404 requests for presence information from the presence server 402 by calling a subscriber interface implemented by the presence service. The requested presence information comprises common presence information and application specific presence information. The presence service calls an application PIDF retrieve interface, implemented by the plugin 406, with authorization credentials of the watcher 404 to retrieve presence information that is specific to the application 410 at 416. The plugin 406 receives the request with authorization credentials of the watcher 404 at 418, and communicates with the application 410 to request the application specific presence information at 420.

At 422, the application 410 performs authentication and authorization to determine whether the watcher 404 can access the requested application specific presence information. If the watcher 404 is permitted to access the requested information, the application 410 retrieves the requested application specific presence information at 422, and returns the information to the application plugin 406 at 424. After the plugin 406 receives the requested application specific presence information at 418, it returns the requested application specific presence information to the presence service at 426.

At 428, the presence service calls an application PIDF retrieve interface, implemented by the plugin 408, with authorization credentials of the watcher 404 to retrieve presence information that is specific to the application 412 at 428. The plugin 408 receives the request with authorization credentials of the watcher 404 at 430, and communicates with the application 412 to request the application specific presence information at 432.

At 434, the application 412 performs authentication and authorization to determine whether the watcher 404 can access the requested application specific presence information. If the watcher 404 is permitted to access the requested information, the application 412 retrieves the requested application specific presence information at 434, and returns the information to the application plugin 408 at 436. After the plugin 408 receives the requested application specific presence information at 430, it returns the requested application specific presence information to the presence service at 438.

At 440, the presence service performs authorization to determine whether the watcher 404 can access the common presence information that the watcher 404 is requesting. If the watcher 404 is allowed to access the common presence information, the presence service retrieves the requested common presence information from a common presence information store, such as the store 114 in FIG. 1. Alternatively, the presence service authorizes the watcher 404 and retrieves the requested common presence information before requesting for the application specific presence information at 416. At 440, the presence service aggregates the common presence information, the presence information that is specific to the application 410, and the presence information that is specific to the application 412. The presence service sends the aggregated presence information to the watcher 404 by a notify interface at 442. It should be noted that the watcher 404 may define the exact presence information that the watcher 404 subscribes at 414. For example, the watcher 404 may subscribe only App1 410 specific presence information, not App2 412 specific presence information. Moreover, the watcher 404 may subscribe certain common presence information, not other common presence information.

Figure 5:
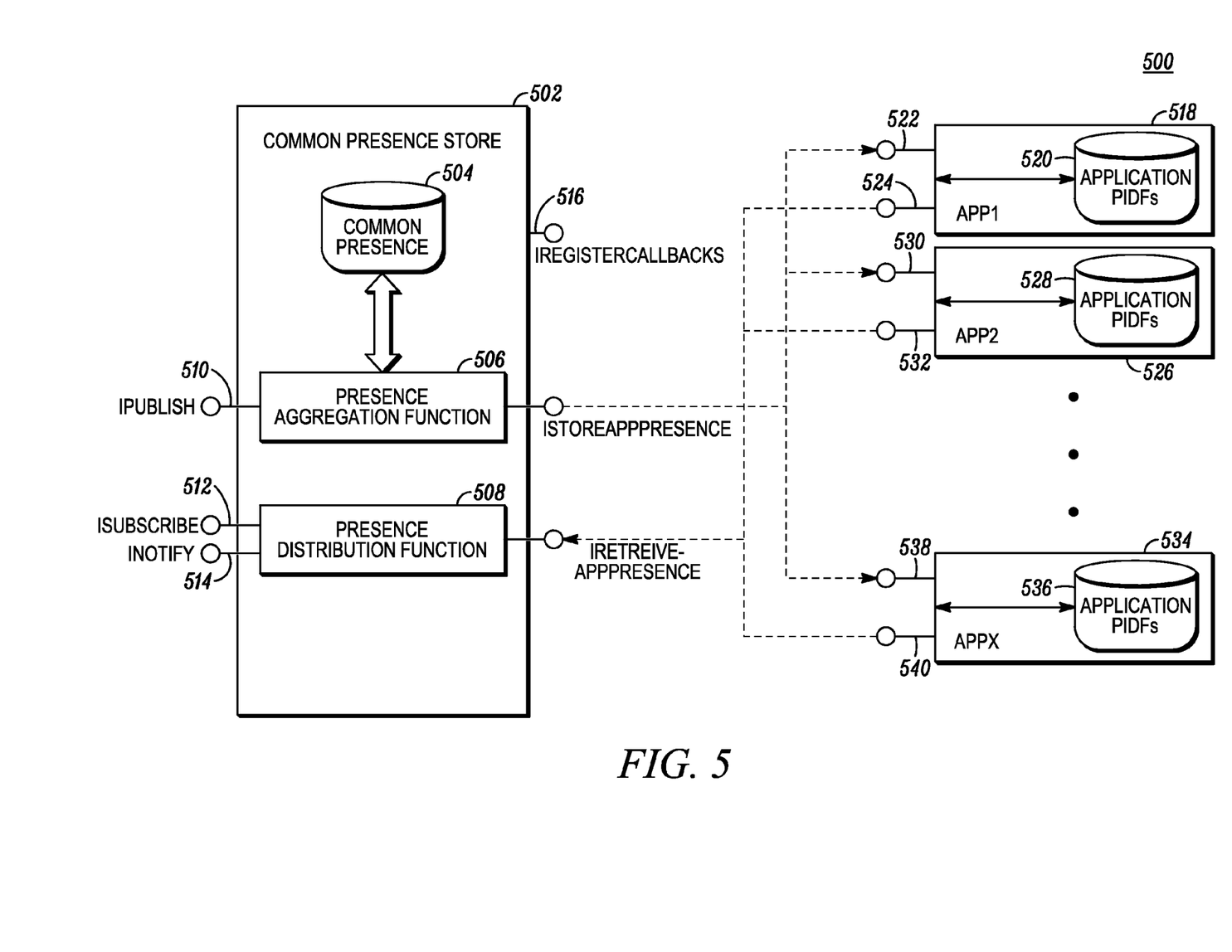
FIG. 5 illustrates a system implementing embodiments of the present teachings.

Each of FIGS. 1-4 teaches a presence server using a plugin to manage application specific presence information. Alternatively, a presence server may use an Application Programming Interface (API) to manage application specific presence information. Referring now to FIG. 5, an illustrative system 500 implementing embodiments in accordance with the present teachings is shown. System 500 comprises a presence server 502. In general, the presence server 502 is implemented using one or more memory devices (although not shown), network interfaces (not shown), and processing devices (not shown), that are operatively coupled, and which when programmed form the means for these system elements to implement their desired functionality. Those skilled in the art, however, will recognize and appreciate that the specifics of this illustrative example are not specifics of the disclosure itself and that the teachings set forth herein are applicable in a variety of alternative settings.

A presence service running on the presence server 502 performs a presence aggregation function 506 and a presence distribution function 508. The presence aggregation function 506 implements a publish software interface IPublish 510, through which a presentity provides presence information to the presence service. The presence aggregation function 506 receives presence information from a presentity, and partitions the presence information into common presence information and application specific presence information. In addition, the presence aggregation function 506 stores the common presence information in a common presence store 504 if the presence service authorizes the presentity to access to the store 504.

The presence distribution function 508 provides presence information to watchers through a subscriber software interface ISubscribe 512 and a notify software interface INotify 514. A watcher requests from the presence server 502 for presence information by calling the subscriber interface ISubscribe 512. Alternatively, a watcher requests notification from the presence server 502 of future changes in one or more presentities' presence information by calling the subscriber interface ISubscribe 512. When the requested presence information is available, the presence distribution function 508 forwards the presence information to the watcher through the notify interface INotify 514.

System 500 further comprises a plurality of applications, 518, 526, and 534. Alternate embodiments of the present teachings may comprise a different number of applications. Each of the applications, 518, 526, and 534, implements an application PIDF store software interface and an application PIDF retrieve software interface. For example, application 518 implements an application PIDF store interface IStoreAppPresence 522, and an application PIDF retrieve interface IRetrieveAppPresence 524. To store presence information that is specific to the application 518, the presence aggregation function 506 calls the application PIDF store interface IStoreAppPresence 522 to store the application specific presence information in a application specific presence information database 520 that is controlled by the application 518. Similarly, the presence distribution function 508 calls the application PIDF retrieve interface IRetrieveAppPresence 524 to retrieve presence information that is specific to application 518. The application PIDF retrieve interface IRetrieveAppPresence 524 retrieves the application specific presence information from the store 520. It should be noted that, for both storing and retrieving presence information, the application 518 performs authentication and authorization of a presentity or watcher against the authorization credentials of the presentity or watcher respectively. The authorization credentials of a presentity usually include the identity of the presentity and a trust assertion from the presence server 502, while the authorization credentials of a watcher usually include the identity of the watcher and a trust assertion from the presence server 502.

Similarly, application 526 implements an application PIDF store interface IStoreAppPresence 530 and an application PIDF retrieve interface IRetrieveAppPresence 532, and controls an application specific presence information database 528. Application 534 implements an application PIDF store interface IStoreAppPresence 538 and an application PIDF retrieve interface IRetrieveAppPresence 540, and controls an application specific presence information database 536. Each of the applications 520, 526, and 534, registers its application PIDF store interface and application PIDF retrieve interface with the presence server 502 by calling a register callback software interface IRegisterCallbacks 516 implemented by the presence server 502. The register callback interface IRegisterCallbacks 516 is further illustrated by reference to FIG. 6.

Figure 6:
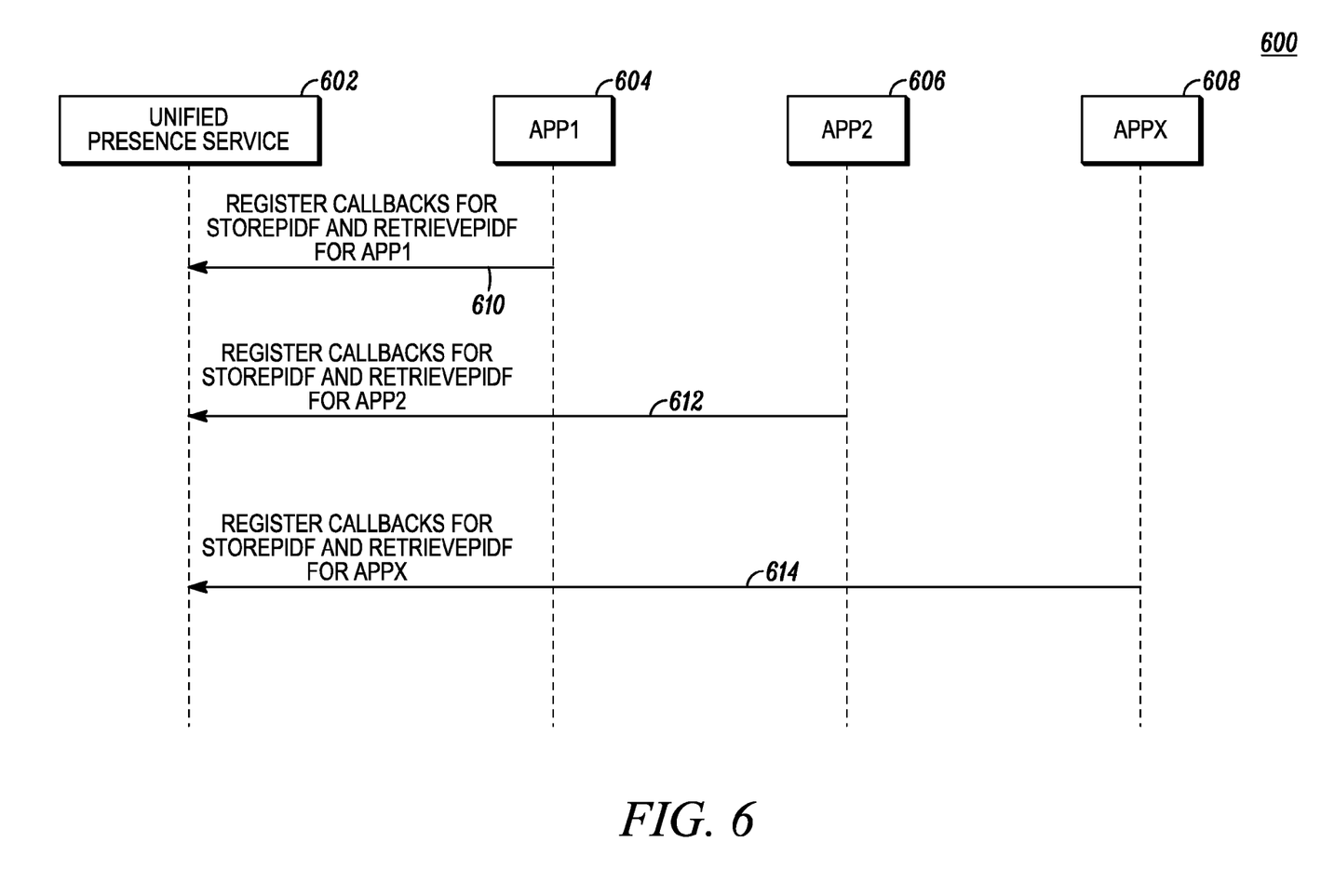
FIG. 6 illustrates a message sequence diagram in accordance with some embodiments.

Turning now to FIG. 6, a message sequence diagram illustrating a method 600 for registering callbacks in accordance with some embodiments of the present disclosures is shown. Method 600 comprises a presence server 602 running a presence service Unified Presence Service. The presence service implements a register callback interface. An application calls the register callback interface to publish the application's application PIDF store interface and application PIDF retrieve interface. For example, an application App1 604 calls the register callback interface at 610 to publish an application PIDF store interface and an application PIDF retrieve interface of the application 604. After a successful publication of the two interfaces of application 604, the presence server 602 becomes knowledgeable of the application PIDF store interface and the application PIDF retrieve interface of application 604. When necessary, the presence server 602 then calls the application PIDF store interface to store presence information that is specific to application 604, and calls the application PIDF retrieve interface to retrieve presence information that is specific to application 604. Similarly, application App2 606 and AppX 608 call the register callback interface at 612 and 614 respectively to publish their application PIDF store interfaces and an application PIDF retrieve interfaces.

Figure 7:
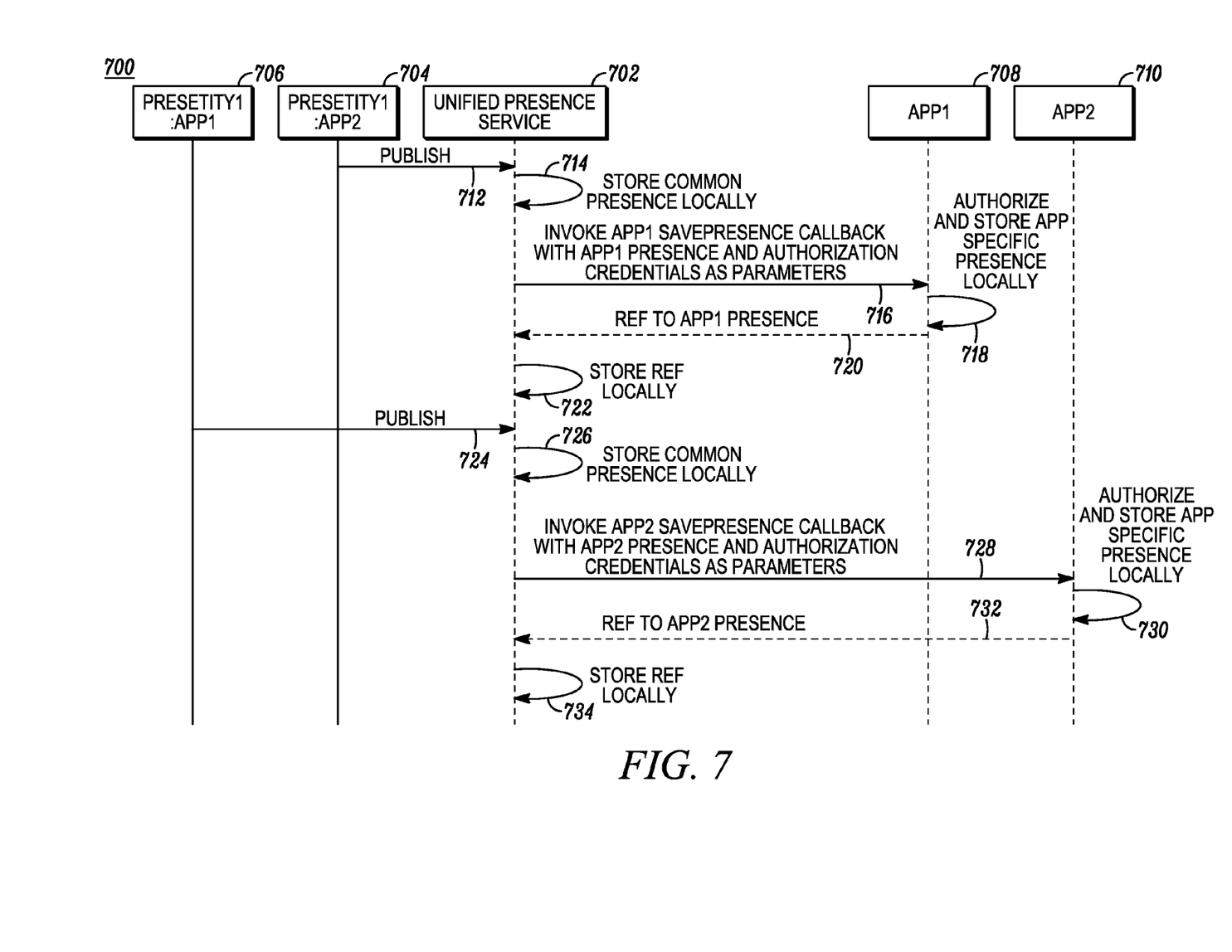
FIG. 7 illustrates a message sequence diagram in accordance with some embodiments.
Figure 8:
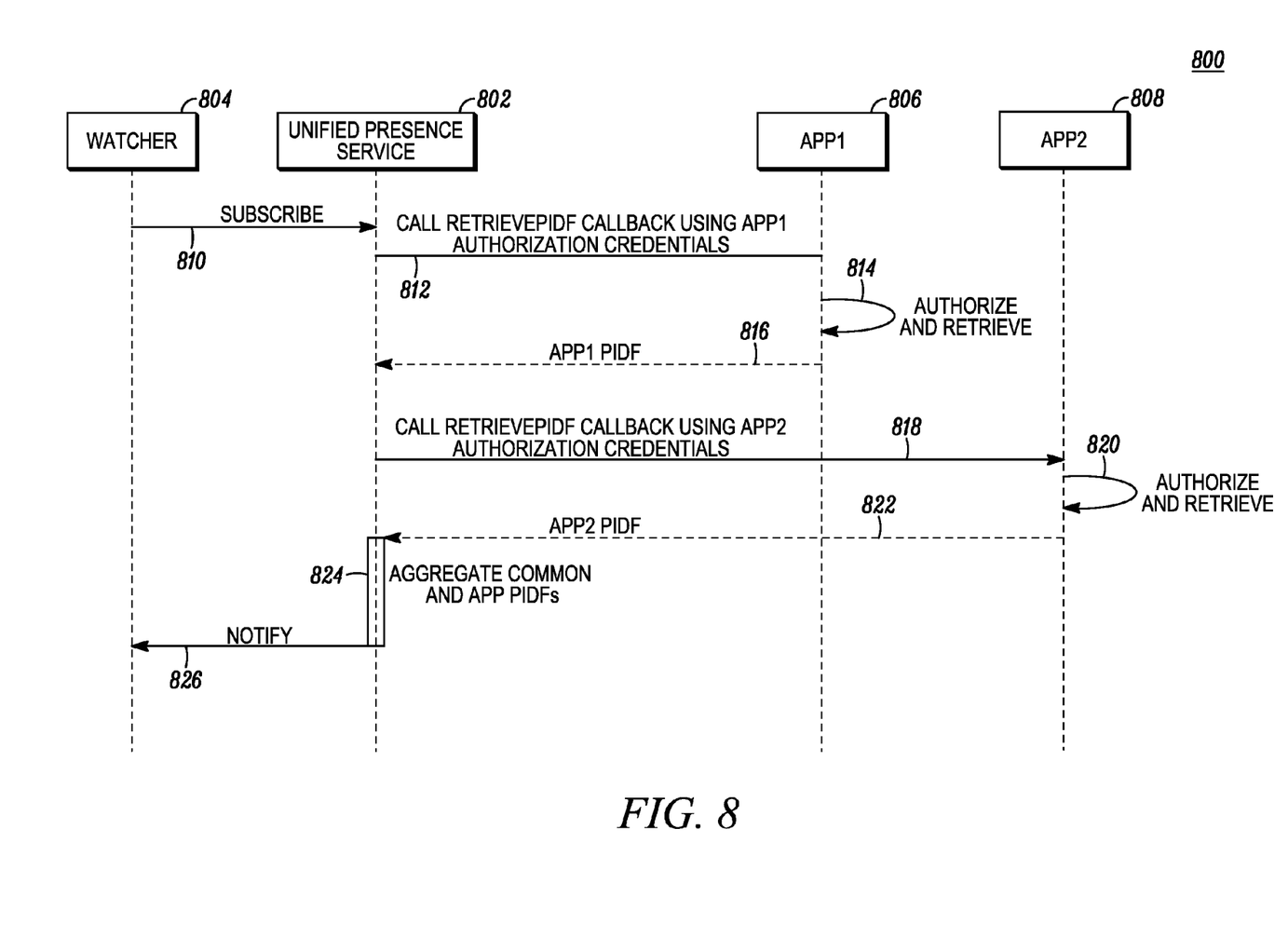
FIG. 8 illustrates a message sequence diagram in accordance with some embodiments.

Each of the FIGS. 7 and 8 shows a message sequence diagram illustrating a method in accordance with some embodiments of the FIGS. 5 and 6. Turning first to FIG. 7, a method 700 comprises a presence server 702 running a presence service Unified Presence Service. Method 700 also comprises a presentity running two different applications, Presentity1: App1 704 and Presentity1: App1 706, communicating with the presence server 702 to provide or publish presence information. In addition, method 700 comprises two applications, App1 708 and App2 710. However, method 700 may support more presentities and applications. At 712, the presentity 704 provides presence information, including both common presence information and application specific presence information, to the presence server 702 using a publish message such as a modified SIP PUBLISH message. The publish message is represented in MIME format, and comprises two types of content. The first type of content comprises common presence information, while the other type of content comprises application specific presence information. At 714, the presence service receives the publish message, and partitions the presence information contained in the publish message into common presence information and application specific presence information. In addition, the presence service authenticates and authorizes the presentity 704 for access to a common presence information store at 714. If the presentity 704 is authorized for such access, the presence service saves the common presence information in the common presence information store at 714.

At 716, the presence service forwards the application specific presence information and authorization credentials of the presentity 704 to the application 708 by calling an application PIDF store interface of the application 708. At 718, the application 708 authenticates and authorizes the presentity 704 for access to an application specific presence information store that is controlled by the application 708. If the application 708 grants the access, the application 708 saves the application specific presence information in the application specific presence information store. The application 708 returns a reference to the saved application specific presence information to the presence service at 720. The presence service then saves the reference in a local store, such as the common presence information store, at 722.

Similarly, the presentity 706 provides presence information to the presence service at 724. At 726, the presence service receives the presence information, and partitions the presence information into common presence information and application specific presence information. In addition, the presence service authorizes the presentity 706 for access to a common presence information store at 726. If the presentity 706 is authorized for such access, the presence service saves the common presence information in the common presence information store at 726.

At 728, the presence service forwards the application specific presence information and authorization credentials of the presentity 706 to the application 710. At 730, the application 710 authorizes the presentity 706 for access to an application specific presence information store that is controlled by the application 710. If the application 710 grants the access, the application 710 saves the application specific presence information in the application specific presence information store. The application 710 returns a reference to the saved application specific presence information to the presence service at 732. The presence service then saves the reference in a local store, such as the common presence information store, at 734.

Turning now to FIG. 8, a method 800 comprises a presence server 802 running a presence service. Method 800 also comprises a watcher 804, communicating with the presence server 802 to request for presence information. In addition, method 800 comprises two applications, 806 and 808. However, the present teachings support more watchers and applications. At 810, the watcher 804 requests for presence information from the presence server 802 by calling a subscriber interface implemented by the presence service. The requested presence information comprises common presence information and application specific presence information. The presence service calls an application PIDF retrieve interface, implemented by the application 806, with authorization credentials of the watcher 804 to retrieve presence information that is specific to the application 806 at 812. At 814, the application 806 performs authentication and authorization to determine whether the watcher 804 has the requisite credentials to access the requested application specific presence information. If the watcher 804 is permitted to access the requested information, the application 806 retrieves the requested application specific presence information at 814, and returns the information to the presence service at 816.

At 818, the presence service calls an application PIDF retrieve interface, implemented by the application 808, with authorization credentials of the watcher 804 to retrieve presence information that is specific to the application 808. At 820, the application 808 performs authentication and authorization to determine whether the watcher 804 can access the requested application specific presence information. If the watcher 804 is permitted to access the requested information, the application 808 retrieves the requested application specific presence information at 820, and returns the retrieved information to the presence service at 822.

At 824, the presence service performs authorization to determine whether the watcher 804 can access the common presence information that the watcher 804 is requesting. If the watcher 804 is allowed to access the common presence information, the presence service retrieves the requested common presence information from a common presence information store, such as the store 114 in FIG. 1. Alternatively, the presence service authorizes the watcher 804 and retrieves the requested common presence information before requesting for the application specific presence information at 812. At 824, the presence service aggregates the common presence information, the presence information that is specific to the application 806, and the presence information that is specific to the application 808. Thereafter, the presence service sends the aggregated presence information to the watcher 804 by a notify interface at 826.

Persons of skill in the art will understand that this disclosure may be extended to other embodiments than those specifically disclosed herein. In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, and the like may be used solely to distinguish one entity or action from another entity or action without necessarily requiring or implying any actual such relationship or order between such entities or actions. The terms "comprises," "comprising," "has," "having," includes," "including," "contains," "containing," or any other variation thereof, are intended to cover a non-exclusive inclusion, such that a process, method, article or apparatus that comprises, has, includes, contains a list of elements does not include only those elements but may include other elements not expressly listed or inherent to such process, method, article, or apparatus. An element proceeded by "comprises . . . a", "has . . . a", "include . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus described herein. The non-processor circuits may include, but are not limited to, a radio receiver, a radio transmitter, signal drivers, clock circuits, power source circuits, and user input devices. As such, these functions may be interpreted as steps of a method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage medium include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for managing common and application specific presence information, the method comprising:
    receiving, by a presence server, a publication message comprising presence information from a presentity;
    partitioning, by the presence server, the presence information into common presence information and application specific presence information, wherein common presence information is presence information shared among a plurality of applications and application specific presence information is presence information specific to particular application;
    storing, by the presence server, the common presence information in a common presence information database, wherein authorization for access to the common presence information database is controlled by the presence server; and
    forwarding, by the presence server, the application specific presence information to a database external to the presence server; and
    controlling, by the external database, storage of the application specification presence information and authorization for access to the application specific presence information;
    wherein receiving the publication message comprises receiving a Session Initiation Protocol (SIP) PUBLISH message that includes the presence information.

2. The method of claim 1, wherein both the application specific presence information and the common presence information are included in the SIP PUBLISH message in Presence Information Data Format (PIDF).

3. The method of claim 1, wherein at least the application specific presence information is included in the SIP PUBLISH message in Multipurpose Internet Mail Extensions (MIME) format.

4. The method of claim 1, wherein the application specific presence information is provided to the external application using an Application Programming Interface client.

5. The method of claim 1, wherein the application specific presence information is provided to the external application using an Application Programming Interface.

6. The method of claim 1 further comprising:
    the presence server performing:
    receiving, from a watcher, a request to receive the presence information for the presentity; and
    requesting the external database to perform authorization for access, for the watcher, and provide the application specific presence information.

7. The method of claim 6 further comprising:
    the presence server performing:
    receiving the application specific presence information when the authorization and access is provided to the watcher by the external database;
    providing the authorization to the watcher for the common presence information;
    providing, to the watcher in response to the request to receive the presence information for the presentity, the common presence information and the application specific presence information.

8. The method of claim 6, wherein requesting the external database to perform authorization for access, for the watcher, and provide the application specific presence information is performed using an Application Programming Interface client.

9. The method of claim 6, wherein requesting the external database to perform authorization for access, for the watcher, and provide the application specific presence information is performed using an Application Programming Interface.

10. A server for managing common and application specific presence information, the server comprising:
    a one or more processing devices that are configured to receive a publication message comprising presence information from a presentity and partition the presence information into common presence information and application specific presence information, wherein common presence information is presence information shared among a plurality of applications and application specific presence information is presence information specific to particular application;
    a one or more memory devices coupled to the processing device that are configured to maintain a common presence information store that stores the common presence information in a common presence information database, wherein authorization for access to the common presence information database is controlled by the server;
    wherein the one or more processing devices are configured to forward the application specific presence information to a database that is external to the server; and
    wherein receiving the publication message comprises receiving a Session Initiation Protocol (SIP) PUBLISH message that includes the presence information.

11. The server of claim 10 further comprising a plug-in that implements a software interface that is configured to receive the application specific presence information, wherein the plug-in is configured to execute private protocols to forward the application specific presence information to the external application.

12. The server of claim 11 wherein the one or more processing devices further are configured to receive a request from a watcher for the application-specific presence information and request the plug-in to obtain the application-specific presence information from the external application.

13. A system comprising:
    a server for managing common and application specific presence information, wherein the server is configured to:
        receive a publication message comprising presence information from a presentity and partition the presence information into common presence information and application specific presence information, wherein common presence information is presence information shared among a plurality of applications and application specific presence information is presence information specific to particular application;
        maintain a common presence information store that stores the common presence information in a common presence information database, wherein authorization for access to the common presence information database is controlled by the server; and forward the application specific presence information to database that is external to the server; and the database external to the server, wherein the database is configured to:

control storage of the application specification presence information and authorization for access to the application specific presence information;

wherein the server is configured to retrieve the application specific presence information from the application database for conveyance to a watcher; and wherein receiving the publication message comprises receiving a Session Initiation Protocol (SIP) PUBLISH message that includes the presence information.

* * * * *